2,815,995

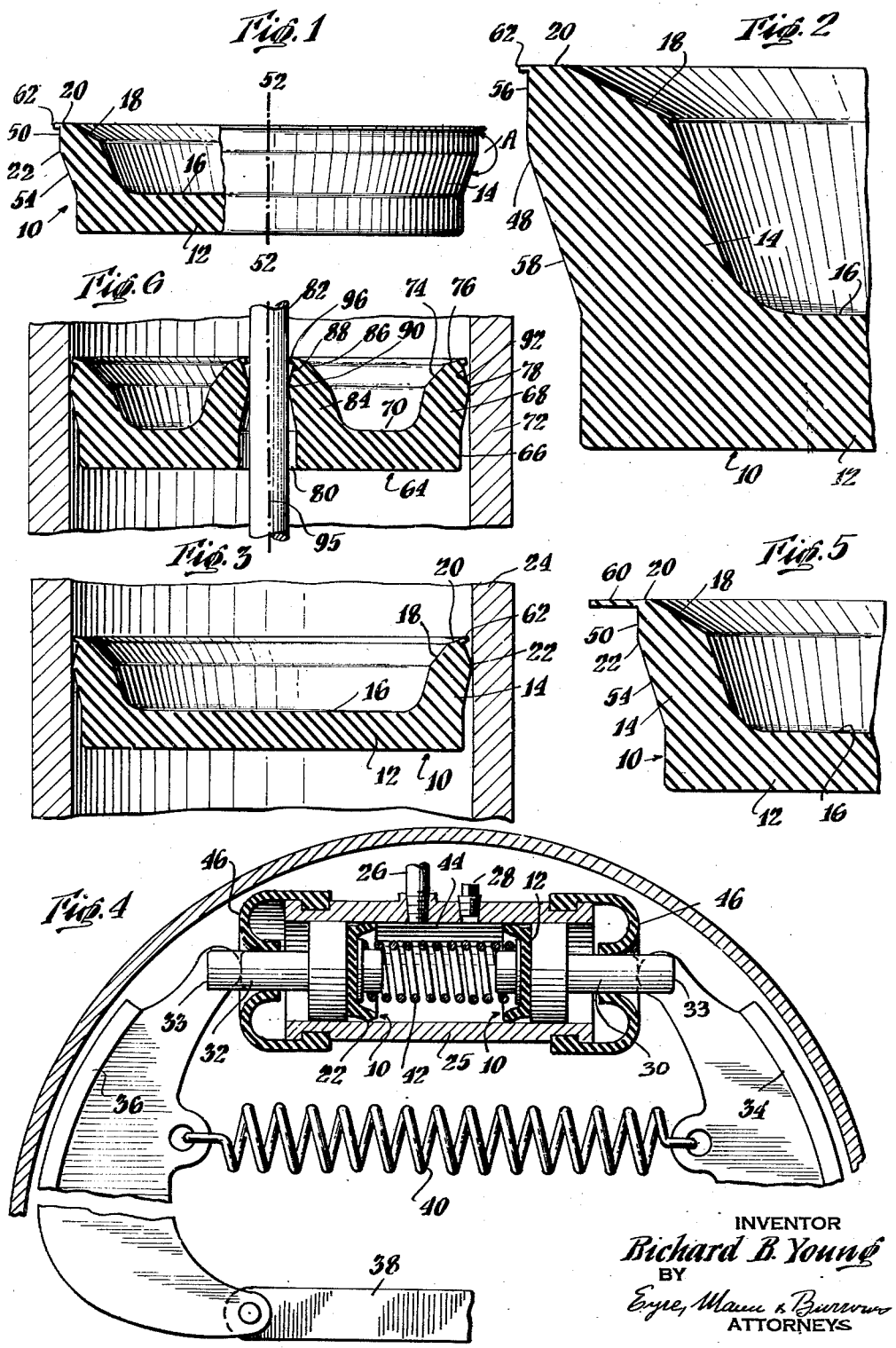
Dec. 10, 1957  R. B. YOUNG  2,815,995
LIP TYPE SEAL FOR SEALING HYDRAULIC
AND PNEUMATIC PRESSURE SYSTEMS
Filed June 28, 1954
INVENTOR
Richard B. Young
BY
Eyre, Mann & Burrows
ATTORNEYS

LIP TYPE SEAL FOR SEALING HYDRAULIC AND PNEUMATIC PRESSURE SYSTEMS

Richard B. Young, Mattapoisett, Mass., assignor to Acushnet Process Company, a corporation of Massachusetts Application June 28, 1954, Serial No. 439,529

3 Claims. (Cl. 309—33)

This invention relates to an improved lip type seal of the type used in hydraulic and pneumatic pressure systems and in particular to an improved piston head for sealing fluid in the pressure cylinder of vehicular brake systems.

The type of piston head to which this invention relates is in the form of a cup with a sloping side wall of resilient material which in use presses out against the cylinder wall to form a seal for the fluid. The ordinary type of cup is made of flexible rubber or rubber-like materials and since it is made in a two-piece mold there is usually some flash left around the lip of the cup. The flash is of course ragged and it must be removed in order to achieve a sharply cut uniform edge which is required for sealing fluid in the cylinder. The flash is ordinarily removed by carefully cutting off a small portion of the top of the cup with a knife. Knife trimming, however, is not very satisfactory and it is a very difficult and expensive operation, resulting in a large percentage of rejects.

I have now discovered that it is possible to materially improve the sealing action and at the same time eliminate knife trimming by building a molded edge or corner into the sloping side wall of the cup. When this done, sealing action takes place at the molded edge rather than at the lip of the cup which is tilted inwardly away from the cylinder wall. Since the lip of the cup is tilted inwardly away from the cylinder wall the flash need only be superficially trimmed away by mechanical means and any flash remaining around the lip of the cup will not adversely affect sealing action. In actual tests, cups made in accordance with my invention give superior sealing action over the more expensive knife trimmed cups.

The structure of the cup of my invention and the way in which it is made may be readily understood by reference to the accompanying drawing in which—

Fig. 1 is a front elevational view of the cup of my invention cut away in part to show its construction;

Fig. 2 is an enlarged sectional view showing a modified form of the cup of Fig. 1;

Fig. 3 illustrates the cup of Fig. 1 as it appears in a cylinder;

Fig. 4 illustrates the way the cup of Fig. 3 may be used in a hydraulic brake cylinder;

Fig. 5 is a front elevational sectional view of the cup of Fig. 1 as it comes from the mold; and Fig. 6 is a sectional view of another form of the cup of my invention.

Referring to the drawings, cup 10 is made up of a disc or base 12 and an annular flange 14 of resilient material which extends upwardly and outwardly away from the top 16 of base 12 to form a sloping side wall for the cup. The inside edge of the top of flange 14 is beveled at 18 and the remaining flat section at the top of the flange forms a lip 20. In accordance with the present invention a molded edge or corner 22 is built into the outside surface of flange 14 and it is by means of this molded edge that sealing action in the cylinder is achieved. This is done by making the circumference around the outside of cup 10 at molded edge 22 slightly larger than the circumference of the bore of the cylinder for which it is intended. As a result, the sides of cup 10 are squeezed together in the area of molded edge 22 when the cup is fitted into the bore of cylinder 24 (see Fig. 3) and lip 20 is thereby tilted inwardly away from the wall of the cylinder and molded edge 22 is brought into contact with the cylinder wall. Since the material of the side wall of cup 10 is resilient, the flexed side wall of the cup at all times tends to push molded edge 22 out against the cylinder wall so that sealing action takes place at molded edge 22 rather than at the lip of the cup.

The cup of my invention may be used in any pneumatic or hydraulic apparatus where it is necessary to achieve a tight seal for containing liquids or gases in a closed system. One important application for the cup of my invention is in the pressure cylinders of vehicular brake systems. Such a pressure cylinder is illustrated in Fig. 4. Referring now to Fig. 4 the pressure cylinder 25, or wheel cylinder as it is ordinarily called, receives fluid from the master cylinder (not shown) by means of a brake fluid line 26. Trapped air may be bled off by means of bleed screw 28. Two operating pistons 30 and 32 are slidably mounted in each of the open ends of cylinder 25 and each of these pistons carry a cup 10 made in accordance with the present invention. As previously described, molded edge 22 of cup 10 bears against the cylinder wall and seals the cylinder against the escape of fluid. Pistons 30 and 32 are connected at 33 with brake shoes 34 and 36, respectively, which are in turn interconnected at the other end as for example by means of a bar 38. Brake shoes 34 and 36 are normally held away from the brake drum 38 by means of a spring 40. This spring is strong enough to hold the brake shoes away from the brake drum, but spring 40 is not strong enough to collapse spring 42 which maintains a space 44 between the pistons for the hydraulic brake fluid. If desired, rubber dust caps 46 may be positioned at either end of cylinder 25 to prevent dirt from fouling up the working parts.

In operation, fluid under pressure is forced to enter space 44 between the cups. Since the fluid cannot pass the molded edges 22 it builds up pressure and causes pistons 30 and 32 to expand out of each end of cylinder 25. The expanded pistons in turn force the brake shoes against the brake drum to stop the vehicle. When the fluid pressure is released, spring 40 forces the pistons back into cylinder 25 and the molded edges 22 of cups 10 force the fluid back into the master cylinder. In doing this the molded edge of the cup wipes the cylinder wall substantially clean of fluid which might otherwise be thrown out and lost against the brake shoes when the brakes are next applied. Of course, loss of fluid from the system cannot be tolerated and in actual test the molded edge of my cup gave superior sealing and wiping action over the ordinary type of cup which requires a knife-trimmed edge at the lip of the cup for satisfactory sealing action.

In the manufacture of cup 10, molded edge 22 may be formed in any convenient way and it may be a sharp edge as shown in Fig. 1 or rounded off as at 48 of Fig. 2. It is desirable, however, for my purpose to position the outer surface of the cylindrical top portion 50 in the side wall of cup 10 so that it will be substantially parallel to vertical axis 52 (Fig. 1) through the cup. For example, considering molded edge 22 as a reference point, if the outer surface of top portion 50 slopes outwardly at a substantial angle away from axis 52, then when the cup is fitted into the cylinder for which it is intended, the lip of the cup and the outer surface of the top portion of the cup will be in contact with the walls of the cylinder and sealing action at molded edge 22 as illustrated in Fig. 3 will not be achieved. On the other hand, if the outer surface of top portion 50 slopes inwardly toward axis 52 at a substantial angle, then it would be necessary to split the mold at edge 22 in order to draw the cup from the mold. This would also result in flash being formed at molded edge 22, and in such case the flash would have to be cut away which, as described hereinabove, is objectionable. None of these problems exist when the outer surface of top portion 50 of the side wall of cup 10 is positioned substantially parallel to the vertical axis 52 through the cup. In this connection it will be understood that because of the resilient nature of the side wall of the cup a small amount of undercut in the mold is permissible before it is necessary to split the mold at edge 22.

The most convenient way of forming a molded edge or corner 22 in the outer wall of the cup is to change the angularity of the surface of the side wall. For example, in Fig. 1, molded edge 22 is achieved by positioning the outer surface of the bottom portion 54 of the side wall of cup 10 at an obtuse angle "A" with the outer surface of the top portion 50 of the side wall of the cup. The same is true in Fig. 2, except in this case the sharp corner at the junction between the top and bottom portions 56 and 58, respectively, is rounded off so that molded edge 48 is not a sharp corner as in Fig. 1. It will be understood that the exact angle "A" between the top and bottom portions of the outer surface of the side wall of the cup is not critical as long as the outer surface of top portion 50 is positioned substantially parallel to axis 52 of cup 10. We prefer, however, to make angle "A" obtuse since this gives the most satsifactory wiping and sealing action and it provides for easier molding and prevents the sealing edge from becoming rough due to dirty molds. In such case the outer surface of bottom portion 54 slopes down away from molded edge 22 and in toward axis 52 to join top portion 50 with the top of the base 12 of cup 10. Referring to Fig. 1 it will be seen that the sloping bottom portion of the side wall of the cup is in the general form of a truncated cone.

Cup 10 may be made of rubber or rubber-like compositions or other resilient materials and it is manufactured in a two-piece mold. As a result, there is always some flash 60 remaining around the lip of the cup as it comes from the mold (see Fig. 5). Since the sealing action of my cup is achieved by means of the molded edge 22 and not the lip of the cup, flash 60 may be superficially trimmed away with a close die and the rough uneven edge of the small amount of flash 62 remaining on the lip of the cup has no adverse effect on sealing action. In the drawings residual flash 62 is exaggerated for the sake of illustration.

Figs. 1 through 4 illustrate the way in which the molded edge of the cup of my invention may be used to provide an outside seal for the bore of a cylinder. The molded edge may also be used for inside sealing, as for example, in connection with a circular body such as a shaft operating within a cylinder. Alternatively, it may be used to give the combination on an inside and an outside seal. This is illustrated in Fig. 6. As there shown, cup 64 is made up of a disc or base 66 having an outside flange 68 of resilient material which slopes upwardly from the top 70 of base 66 towards the wall of cylinder 72. The inside edge of the top of flange 68 may be beveled at 74 and the remaining flat section at the top of the flange forms a lip 76. A molded edge or corner 78 is built into the outside surface of flange 68 which bears against the wall of cylinder 72 and seals the cylinder against loss of fluid. Of course, the circumference around the outside of cup 64 at molded edge 78 is made slightly larger than the circumference of the bore of cylinder 72 so that the sides of the cup are squeezed together in the cylinder in the area of molded edge 78. This brings the molded edge into contact with the wall of the cylinder and lip 76 is tilted inwardly away from the cylinder wall, as previously described herein for the cup of Figs. 1 through 4.

Base 66 of cup 64 has a hole 80 which accommodates a shaft 82. Preferably hole 80 is made slightly larger than shaft 82 so that the base of the cup will not rub against the shaft. Around the perimeter of hole 80 is an annular flange 84 of resilient material which slopes upwardly from the top 70 of base 66 and in towards shaft 82. The top portion of flange 84 projects inwardly over hole 80 and it forms an interior sloping side wall in the cup. The outside edge of the top of flange 84 may be beveled at 86 and the remaining flat portion at the top of the flange forms a lip 88. In accordance with the present invention, a molded edge or corner 90 similar to molded edge 78 is built into the inside surface of flange 84 and it is by means of this molded edge that sealing action is achieved. This is done by making the circumference around the inside of flange 84 at molded edge 90 slightly smaller than the circumference of the shaft 82 for which it is intended. As a result, annular flange 84 is expanded in the area of molded edge 90 when the cup is assembled on shaft 82 and lip 88 is thereby tilted outwardly away from the shaft and molded edge 90 is brought into contact with the shaft. Since the material of flange 84 is resilient, molded edge 90 is at all times pushed in against the shaft so that sealing action takes place at the molded edge rather than at the lip of the cup.

In the manufacture of cup 64 the same factors must be taken into consideration in building molded edges 78 and 90 into the interior and exterior side walls of the cup as are considered in building molded edge 22 into the side wall of the cup of Figs. 1 through 4. Thus the outer surface of top portion 92 of flange 68 and the inner surface of the top portion 94 of flange 84 are positioned substantially parallel to vertical axis 95 through the cup and the angle between the top and bottom portions of the side wall of the cup is preferably an obtuse angle. If desired, molded edges 78 and 90 may be rounded off as illustrated in Fig. 2. Residual flash at the lip of cup 64 is indicated at 96. The cup shown in Fig. 6 may, for example, be used in those cases where it is desirable to have a pair of pistons and shafts operating within the same cylinder, as for instance, in the master cylinder of a vehicular hydraulic brake system.

It will be understood that it is intended to cover all changes and modifications of the preferred embodiment of my invention herein chosen for the purpose of illustration which do not constitute departures from the spirit and scope of my invention.

What I claim is:

1. A cup of resilient material adapted to form a fluid seal in a cylindrical member comprising a base member in the general form of a disk having the diameter of its outside surface smaller than the inside diameter of the cylinder for which it is intended, a side wall for the cup in the general form of an annular flange positioned on top of said base member, said flange comprising a substantially cylindrical top portion with outside diameter greater than the inside diameter of said cylinder and a bottom portion in the general form of a truncated cone the outside surface of which connects the periphery of the base member with the outside surface of the cylindrical top portion of the side wall of the cup to provide a molded edge at the junction between the said top and bottom portions adapted to form a seal with the wall of the cylindrical member when the cup is positioned therein.

2. A structure as specified in claim 1 in which the base member has a hole positioned therein adapted to accommodate a shaft operating within the cylindrical member, said hole having an inside diameter greater than the outside diameter of the shaft, a flange positioned on the base member of the cup around the periphery of said hole, said flange comprising a substantially cylindrical top portion with inside diameter smaller than the outside diameter of said shaft and a bottom portion in the general form of a truncated cone, the surface of which connects the periphery of the hole with the surface of the cylindrical top portion of the flange to form a molded edge at the junction between the said top and bottom portions whereby when the cup is installed in the cylindrical member for which it is intended, the molded edge will contact the shaft and be expanded thereby, causing the flange to rotate about its base outwardly away from the shaft to tilt the inside surface of the cylindrical top portion of the flange out away from the shaft, leaving the molded edge in contact with the shaft to seal it against loss of fluid.

3. In a circular member the combination which comprises a cup of resilient material for sealing fluid relative to the circular member comprising a base member in the general form of a disc having the diameter of its outside surface somewhat smaller than the inside diameter of the circular member to provide an annular space between said base member and circular member, a side wall for the cup in the general form of an annular flange positioned on top of said base member, said flange comprising a substantially cylindrical top portion of outside diameter greater than the inside diameter of said circular member and a bottom portion in the general form of a truncated cone the outside surface of which connects the periphery of the base member with the outside surface of the cylindrical top portion of the side wall of the cup to provide a molded edge at the junction between the said top and bottom portions, said molded edge being in contact with the circular member, said cylindrical top portion of the side wall of the cup having its outside surface positioned at an angle with the wall of the circular member with the lip at the top of the cylindrical top portion of the side wall of the cup held away from and out of contact with the wall of the circular member, and said bottom portion of the side wall of the cup having its outside surface positioned at an angle with the wall of the circular member with the lower portion of the outside surface of the bottom portion of the side wall of the cup held away from and out of contact with the wall of the circular member whereby the molded edge which bears against the wall of the circular member provides a seal against loss of fluid.

References Cited in the file of this patent

UNITED STATES PATENTS

| | | |
|---|---|---|
| 1,613,066 | Turner | Jan. 4, 1927 |
| 2,036,038 | Gottlieb | Mar. 31, 1936 |
| 2,081,040 | King | May 18, 1937 |
| 2,254,937 | Dick | Sept. 2, 1941 |
| 2,308,875 | Goepfrich | Jan. 19, 1943 |
| 2,383,959 | Dick | Sept. 4, 1945 |
| 2,424,225 | Dick | July 22, 1947 |
| 2,679,441 | Stillwagon | May 25, 1954 |